Oct. 16, 1956     K. L. SANDERS, JR     2,767,258

VOLTAGE DOUBLING DEMODULATOR

Filed Oct. 10, 1952

INVENTOR.
KEITH L. SANDERS JR.
BY
*William R. Lane*
ATTORNEY

# United States Patent Office 2,767,258
Patented Oct. 16, 1956

2,767,258

VOLTAGE DOUBLING DEMODULATOR

Keith L. Sanders, Jr., Paramount, Calif., assignor to North American Aviation, Inc.

Application October 10, 1952, Serial No. 314,170

8 Claims. (Cl. 179—171)

This invention pertains to demodulator circuits, and particularly to voltage doubling demodulator circuits.

The device of this invention is a demodulator circuit which is adapted to produce a voltage output signal which has an amplitude approximately twice the amplitude of a pulse voltage or alternating voltage input signal, and has a polarity in accordance with the phase of the input signal relative to a reference signal.

Certain servomechanism applications require that a direct current or low frequency voltage be amplified. One method of amplifying slowly fluctuating voltages is to modulate a voltage of a relatively high frequency with the voltage which is to be amplified and to reverse the phase of the high frequency component when the modulating voltage changes polarity. The modulated voltage is next amplified then demodulated whereby a resultant amplified voltage is obtained which is proportional to the direct current voltage or slowly fluctuating voltage which was applied at the input. There is a need in the servomechanism art for a device which amplifies a mechanical movement and generates a voltage which is a function of the mechanical movement. The desired result is accomplished by a suitable transducer, such as a resolver, which generates a modulated voltage whose envelope has an amplitude which is proportional to the mechanical movement or a function of the mechanical movement, and which modulates a high frequency excitation voltage so that the phase of the high frequency component of the modulated voltage is controlled relative to a reference signal in accordance with the sign of the function. The device of this invention simultaneously demodulates the modulated voltage and doubles the voltage as explained hereinafter.

It is therefore an object of this invention to provide a phase sensitive demodulator whose output voltage has an amplitude which is approximately double the amplitude of the input voltage and has a polarity in accordance with the phase of the high frequency component of the input voltage relative to a reference voltage.

It is another object of this invention to provide a phase sensitive demodulator in which the output voltage is not affected by the voltage supply fluctuations.

It is another object of this invention to provide a pair of gated voltage doublers which phase sensitively demodulates and doubles the amplitude of a modulated signal.

It is another object of this invention to provide a voltage doubling demodulator which maintains its balance for a long period of time.

It is another object of this invention to provide means for amplifying a constant or slowly varying voltage without drift caused by fluctuations of supply voltage.

Other objects of invention will become apparent from the following description taken in connection with the accompanying drawings, in which.

Figure 1:
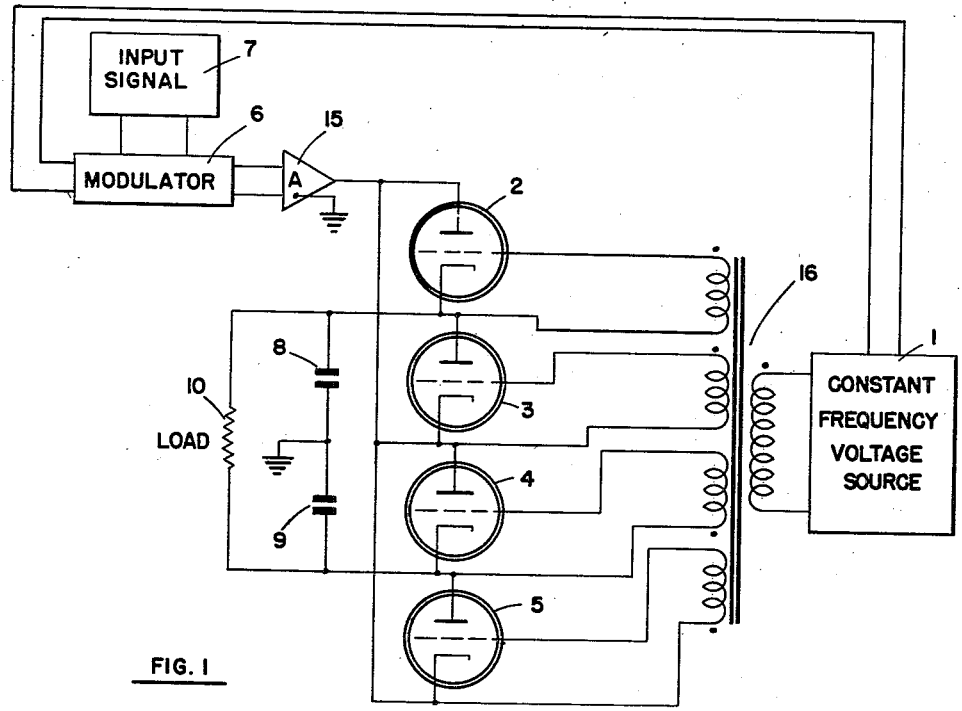
Fig. 1 is a schematic circuit diagram of a preferred embodiment of this invention.

In Fig. 1, constant frequency voltage source 1, whose frequency is substantially higher than the frequency of the input voltage, is connected to modulator 6 and, through transformer 16, between the grids and cathodes of tubes 2, 3, 4, and 5. The voltage applied between the grids and cathodes of tubes 2 and 3 are opposite in phase to the voltages applied between the grids and cathodes of tubes 4 and 5. Input signal voltage 7 is connected to modulator 6 which, in turn, is connected to amplifier 15. Element 7 may be a mechanical movement rather than an input voltage, and element 6 may be an electromechanical modulator, such as a resolver. The output of amplifier 15 is connected between the plates of tubes 2 and 4 together with the cathodes of tubes 3 and 5, and a common terminal between condensers 8 and 9. The common terminal of condensers 8 and 9 is opposite in polarity to the plates of tubes 2 and 4 together with the cathodes of tubes 3 and 5. Condensers 8 and 9 are connected in series across the output represented by load impedance 10. The plate of tube 3 and the cathode of tube 2 are connected to one end of load 10, while the plate of tube 5 and the cathode of tube 4 are connected to the other end of load 10.

Figure 2:
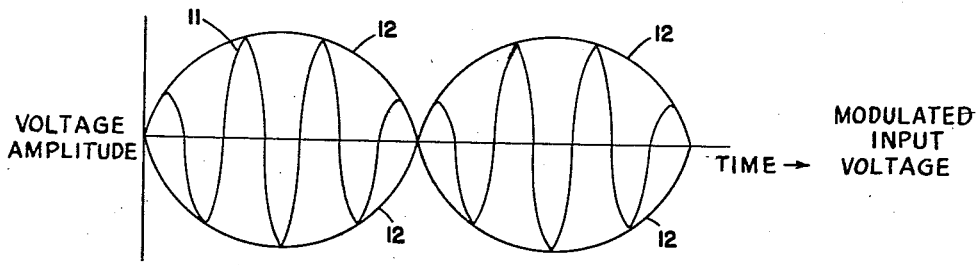
Fig. 2 is a graph of the voltage at the input to this invention plotted against time.

Fig. 2 shows a graph 11 of the voltage output of amplifier 15. Curves 12 represent the voltage envelope from amplifier 15. It is to be noted that the high frequency component of voltage to the right of Fig. 2 is opposite in phase to the high frequency component of voltage to the left of Fig. 2.

Figure 3:
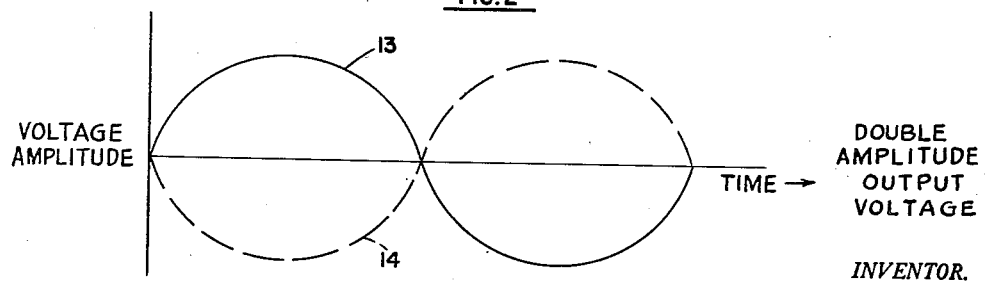
Fig. 3 is a graph of the voltage generated at the output of this invention plotted against time.

Fig. 3 shows a graph 13 of the output voltage of the device of this invention when the potential between the grids and cathodes of tubes 2 and 3 has a particular phase relation to the high frequency component of the input voltage, while the dotted graph 14 shows a plot of the voltage output of the device of this invention when the phase of the voltage applied between the grids and cathodes of tubes 2 and 3 is reversed.

In operation, the voltage applied between the grids and cathodes of tubes 2, 3, 4, and 5 is either in phase with or opposite in phase with the high frequency component of the voltage output from amplifier 15. When the voltage applied between the grids and cathodes of tubes 2 and 3 is in phase with the high frequency component of the voltage from amplifier 15, the voltage applied between the grids and cathodes of tubes 4 and 5 is opposite in phase to the high frequency component of the voltage output of amplifier 15, hence tubes 3 and 4 are gated, and tubes 2 and 5 each conduct over one half cycle of the high frequency component. When the voltage applied between the grids and cathodes of tubes 2 and 3 is opposite in phase to the high frequency component of voltage from amplifier 15, the voltage applied between the grids and cathodes of tubes 4 and 5 is in phase with the high frequency component of the voltage output of amplifier 15, hence tubes 2 and 5 are gated, and tubes 3 and 4 each conduct over one half cycle of the high frequency component. Tubes 3 and 4 therefore operate as a pair, and tubes 2 and 5 operate as a pair. The operation of tubes 3 and 4 is explained herein. When the voltage applied to the plate of tube 4 is positive with respect to the common terminal between condensers 8 and 9 and the grid of tube 4 is of a positive potential with respect to the cathode of tube 4, current flows through tube 4 and charges condenser 9 with a voltage which is approximately equal to the peak voltage applied across tube 4 minus the voltage drop across tube 4. The polarity of the voltage is negative at the common terminal between condensers 8 and 9, and is positive on the plate of condenser 9 which is connected to load 10. When the high frequency component of the voltage output from amplifier 15 reverses in polarity during the next half cycle, the grid potential of tube 3 is driven positive with respect to the cathode of tube 3 and the cathode potential of tube 3 is driven negative with respect to the common terminal between condensers 8 and 9. Hence tube 3 conducts current and charges condenser 8 to a voltage which is approximately equal to the peak voltage of the output of amplifier 15 minus the voltage drop across tube 3. The polarity of the voltage upon condenser 8 is positive at the common terminal between condensers 8 and 9 and negative upon the plate of condenser 8 which is connected to load 10. Thus the voltage across the series combination of condensers 8 and 9 is substantially equal to twice the peak voltage of the output of amplifier 15 with the negative terminal of the series combination at condenser 8 and the positive terminal of the series combination at condenser 9. The amplitude of the voltage across condensers 8 and 9 is proportional to the amplitude of envelope 12 in Fig. 2. When the output voltage of amplifier 15 passes to the next half cycle of the voltage shown in Fig. 2, the phase of the high frequency portion of the voltage reverses and tubes 2 and 5 operate in a manner identical to that described for the operation of tubes 3 and 4 but charge condensers 8 and 9 with a voltage whose polarity is opposite to that described for the operation of tubes 3 and 4.

Tubes 2 and 5 together with condensers 8 and 9 also form a voltage doubler. One voltage doubler, while conducting current, charges condensers 8 and 9 with a polarity opposite to the polarity to which condensers 8 and 9 are charged by the other voltage doubler while it is conducting current. Tubes 2, 3, 4, and 5 are gated by signals applied to their grids through transformer 16 and pass signals when both their grid and plate are simultaneously positive with respect to their cathode. Thus, one voltage doubler is gated shut when the signal output from amplifier 15 is in phase with the voltage from voltage source 1, while the other voltage doubler is gated shut when the signal output from amplifier 15 is opposite in phase to the voltage from voltage source 1. The polarity of the voltage across load 10 depends upon which voltage doubler is conducting current. Line voltage fluctuations do not disturb the output of the device of this invention because only signal voltages appear upon the active elements of tubes 2, 3, 4, and 5. Thus the device of this invention provides a means for amplifying direct current voltages and for amplifying slowly fluctuating voltages by modulating, amplifying, and demodulating them with a constant high fidelity which is undisturbed by fluctuations of line voltages.

The device of this invention is a voltage doubling demodulator, phase discriminator, or phase sensitive device whose output is substantially double the amplitude of the envelope of its input signal and whose polarity is determined by the phase relationship of the high frequency component of the modulated signal with respect to a reference signal of the same frequency.

Although the invention has been described and illustrated in detail, it is to be clearly understood that the same is by way of illustration and example only and is not to be taken by way of limitation, the spirit and scope of this invention being limited only by the terms of the appended claims.

I claim:

1. A voltage doubling demodulator comprising two pairs of vacuum tubes; each said tube having a cathode, a plate, and at least one grid; in each said pair of vacuum tubes, the plate of the first said tube being connected to the cathode of the second said tube and the plate of the second said tube being connected to the cathode of the first said tube; a constant frequency voltage source of the same frequency as the input voltage to said demodulator; a transformer; said voltage source being connected to the primary of said transformer; said transformer having four secondary windings; each said secondary winding being connected between the grid and cathode of a different one of said vacuum tubes in a manner to cause the voltage applied between the grid and cathode of each said tube of one said pair of vacuum tubes to be opposite in phase to the voltage applied between the grid and cathode of each said tube of the other said pair of vacuum tubes; two condensers connected in series; the plate of said first tube of one said pair of tubes being connected to one end of said series connected condensers and the plate of said first tube of the other of said pair of tubes being connected to the other end of said series connected condensers; the plate of said second tube of each said pair of tubes being connected to the input voltage of said demodulator, the opposite terminal of said input voltage connection being connected to the common terminal of said series-connected condensers.

2. A device as recited in claim 1 and further comprising a modulator connected to said voltage source for modulating the voltage of said voltage source in accordance with an input signal; an amplifier; said modulator being connected to said amplifier; said amplifier being connected to the input of said demodulator whereby said input signal is amplified with high fidelity.

3. A voltage doubling demodulator comprising a first, second, third, and fourth vacuum tube each having a cathode, a plate, and at least one grid; a first and second condenser connected in series; voltage means for supplying a voltage in phase with the carrier voltage of the modulated signal applied to said demodulator; a transformer; said voltage means being connected to said transformer, said transformer being connected to the grid and cathode of said vacuum tubes with a polarity of voltage between the grid and cathode of said first and second tubes which is opposite to the polarity of voltage between the grid and cathode of said third and fourth vacuum tubes; the voltage to be demodulated being connected between the common terminal of said condensers and the plates of said first and third tubes together with the cathodes of said second and fourth tubes; the cathode of said first tube and the plate of said second tube being connected to one end of said series connected condensers; the cathode of said third tube and the plate of said fourth tube being connected to the other end of said series connected condensers.

4. A device as recited in claim 3 and further comprising a modulator connected to said voltage means for modulating the voltage of said voltage means in accordance with an input signal; an amplifier; said modulator being connected to said amplifier; said amplifier being connected to the input of said demodulator whereby said input signal is amplified with high fidelity.

5. A voltage doubling demodulator comprising four vacuum tubes each having at least a plate, a grid, a cathode, and a heater; two condensers connected in series; voltage means which supplies a voltage which is in phase with the high frequency component of the input signal to said demodulator, said input signal being applied between the center tap of said two condensers and the plates of two of said tubes together with the cathodes of the other said tubes; transformer means connected between said voltage means and the grid and cathode of said tubes; the voltage between the grid and cathode of one of said tubes which has said input signal applied to its plate, together with the voltage between the grid and cathode of one of said tubes which has said input signal applied to its cathode, being opposite in phase to the voltage applied between the grid and cathode of the remaining said tubes; the plate of each of said tubes which has said input signal applied to its cathode being connected to the cathode of the said tube which has said input signal applied to its plate and which has the same polarity of grid potential as said cathode fed tube; one said plate-to-cathode connection being connected to one end of said series-connected condensers and the other said plate-to-cathode connection being connected to the opposite end of said series-connected condensers.

6. A device as recited in claim 5 and further comprising a modulator connected to said voltage means for modulating the voltage of said voltage means in accordance with an input signal; an amplifier; said modulator being connected to said amplifier; said amplifier being connected to the input of said demodulator whereby said input signal is amplified with high fidelity.

7. A voltage doubling demodulator comprising a constant frequency voltage generating means whose frequency is equal to the high frequency component of the voltage to be demodulated, a first and second gated voltage doubler, the output voltage of said first voltage doubler being of opposite polarity to the voltage output of said second voltage doubler, said voltage doublers having the same output terminals, said voltage doublers being connected to and gated by said voltage means, said first voltage doubler being gated to conduct current when said high frequency component is in phase with the voltage of said voltage means, and said second voltage doubler being gated to conduct current when said high frequency component is opposite in phase to the voltage of said voltage generating means, whereby said voltage to be demodulated is demodulated and simultaneously doubled.

8. Means for amplifying a slowly varying signal comprising alternating voltage means of substantially higher frequency than the frequency of said signal; a modulator connected to said signal and said voltage means for modulating the amplitude of said alternating voltage in accordance with the amplitude of said signal and the phase of said alternating voltage in accordance with the polarity of said signal; a first and second gated voltage doubler, the output voltage of said first voltage doubler being of opposite polarity to the voltage output of said second voltage doubler, said voltage doublers having the same output terminals, said first voltage doubler being connected to and gated by said voltage means to conduct current when the output voltage of said modulator is in phase with the voltage of said voltage means, said second voltage doubler being connected to and gated by said voltage means to conduct current when the output voltage of said modulator is opposite in phase to the voltage of said voltage means whereby said output voltage of said modulator is demodulated and substantially doubled.

References Cited in the file of this patent
UNITED STATES PATENTS

| | | |
|---|---|---|
| 1,805,918 | Meissner | May 19, 1931 |
| 2,144,226 | Nyman | Jan. 17, 1939 |
| 2,270,697 | Clark | Jan. 20, 1942 |
| 2,329,073 | Mitchell et al. | Sept. 7, 1943 |
| 2,380,947 | Crosby | Aug. 7, 1945 |
| 2,389,692 | Sherwin | Nov. 27, 1945 |
| 2,399,695 | Satterlee | May 7, 1946 |
| 2,445,773 | Frost | July 27, 1948 |
| 2,487,010 | Wild | Nov. 1, 1949 |
| 2,497,202 | Beard et al. | Feb. 14, 1950 |
| 2,502,887 | Rava | Apr. 4, 1950 |
| 2,519,223 | Cheek | Aug. 15, 1950 |